United States Patent
Duan et al.

(10) Patent No.: US 11,361,553 B2
(45) Date of Patent: Jun. 14, 2022

(54) METHOD AND APPARATUS FOR TRACKING AN AT LEAST PARTIALLY OCCLUDED OBJECT, VEHICLE AND COMPUTER-PROGRAM PRODUCT THEREOF

(71) Applicant: BOE TECHNOLOGY GROUP CO., LTD., Beijing (CN)

(72) Inventors: Ran Duan, Beijing (CN); Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 589 days.

(21) Appl. No.: 16/332,906

(22) PCT Filed: Jun. 13, 2018

(86) PCT No.: PCT/CN2018/091061
§ 371 (c)(1),
(2) Date: Mar. 13, 2019

(87) PCT Pub. No.: WO2019/140860
PCT Pub. Date: Jul. 25, 2019

(65) Prior Publication Data
US 2021/0334555 A1    Oct. 28, 2021

(30) Foreign Application Priority Data
Jan. 16, 2018 (CN) .......................... 201810041758.8

(51) Int. Cl.
*G06V 20/58* (2022.01)
*G06T 7/70* (2017.01)
*G06V 10/44* (2022.01)

(52) U.S. Cl.
CPC ................ *G06V 20/58* (2022.01); *G06T 7/70* (2017.01); *G06V 10/443* (2022.01);
(Continued)

(58) Field of Classification Search
None
See application file for complete search history.

(56) References Cited

U.S. PATENT DOCUMENTS 10,181,085 B2 * 1/2019 Schamp .................. G01B 11/14
2007/0236561 A1 * 10/2007 Anai .................... G01C 21/005
348/46
(Continued)

FOREIGN PATENT DOCUMENTS

CN    101734214 A       6/2010
CN    101976341 A  *    2/2011
(Continued)

OTHER PUBLICATIONS

International Search Report dated Oct. 23, 2018, issued in counterpart application No. PCT/CN2018/091061. (11 pages).
(Continued)

*Primary Examiner* — Delomia L Gilliard
(74) *Attorney, Agent, or Firm* — WHDA, LLP

(57) ABSTRACT

A method for tracking an at least partially occluded object. The method includes recognizing a non-occluded portion of the at least partially occluded object in an input image; generating a simulated image of the at least partially occluded object based on features of the non-occluded portion extracted from the input image; determining first coordinates of the at least partially occluded object in a first coordinate system; and converting the first coordinates of the at least partially occluded object in the first coordinate system into second coordinates in a second coordinate system defined in a display apparatus.

16 Claims, 7 Drawing Sheets

(52) U.S. Cl.
CPC .............. *G06T 2207/20081* (2013.01); *G06T 2207/30196* (2013.01); *G06T 2207/30261* (2013.01)

(56) References Cited

U.S. PATENT DOCUMENTS

| | | | |
|---|---|---|---|
| 2009/0058677 A1 | 3/2009 | Tseng et al. | |
| 2012/0068859 A1 | 3/2012 | Mochizuki | |
| 2012/0121132 A1* | 5/2012 | Asahara | G06K 9/00201 382/103 |
| 2014/0245350 A1* | 8/2014 | Goel | G06T 5/005 725/34 |
| 2014/0307920 A1* | 10/2014 | Holz | G06K 9/00335 382/103 |
| 2014/0324330 A1 | 10/2014 | Minemura et al. | |
| 2016/0342850 A1* | 11/2016 | Elimalech | G06K 9/00798 |
| 2017/0351092 A1 | 12/2017 | Nakata et al. | |
| 2018/0082117 A1* | 3/2018 | Sharma | G06T 19/006 |
| 2018/0293445 A1* | 10/2018 | Gao | B60W 10/10 |
| 2018/0357791 A1* | 12/2018 | Dworakowski | G06T 7/74 |
| 2018/0372858 A1* | 12/2018 | Niihara | G01C 3/22 |
| 2019/0236807 A1* | 8/2019 | Zhang | G06T 7/85 |

FOREIGN PATENT DOCUMENTS

| | | |
|---|---|---|
| CN | 101976341 A | 2/2011 |
| CN | 103158620 A | 6/2013 |
| CN | 104118382 A | 10/2014 |
| CN | 104680532 A | 6/2015 |
| CN | 105378815 A | 3/2016 |
| CN | 105930787 A | 9/2016 |
| CN | 107428288 A | 12/2017 |
| CN | 107532917 A | 1/2018 |
| CN | 108082083 A | 5/2018 |
| JP | S5634546 A | 4/1981 |
| KR | 2009-0072329 A | 7/2009 |
| WO | WO-2014198544 A1 * | 12/2014 ............ G08G 1/167 |

OTHER PUBLICATIONS

Office Action dated May 21, 2019, issued in counterpart CN application No. 201810041758.8, with English translation. (15 pages).

* cited by examiner

METHOD AND APPARATUS FOR TRACKING AN AT LEAST PARTIALLY OCCLUDED OBJECT, VEHICLE AND COMPUTER-PROGRAM PRODUCT THEREOF

CROSS-REFERENCE TO RELATED APPLICATION

This application claims priority to Chinese Patent Application No. 201810041758.8, filed Jan. 16, 2018, the contents of which are incorporated by reference in the entirety.

TECHNICAL FIELD

The present invention relates to smart object-tracking technology, more particularly, to a method for tracking an at least partially occluded object, an apparatus for tracking an at least partially occluded object, a vehicle, and a computer-program product.

BACKGROUND

In recent years, objection recognition devices for vehicular use have been developed. The objection recognition devices can be used to recognize, e.g., a moving object such as a vehicle traveling ahead of the user's vehicle, or a pedestrian. Thus, the objection recognition devices can detect a dangerous situation in its early stage, and notify the driver avoid the danger.

SUMMARY

In one aspect, the present invention provides a method for tracking an at least partially occluded object, comprising recognizing a non-occluded portion of the at least partially occluded object in an input image; generating a simulated image of the at least partially occluded object based on features of the non-occluded portion extracted from the input image; determining first coordinates of the at least partially occluded object in a first coordinate system; and converting the first coordinates of the at least partially occluded object in the first coordinate system into second coordinates in a second coordinate system defined in a display apparatus.

Optionally, generating the simulated image of the at least partially occluded object comprises classifying the non-occluded portion using classifiers trained using extracted features of portions of a plurality of training objects; wherein the simulated image is an image of one of the plurality of training objects, a portion of which comprising extracted features closest matching the features of the non-occluded portion extracted from the input image.

Optionally, converting the first coordinates of the at least partially occluded object in the first coordinate system into the second coordinates in the second coordinate system defined in the display apparatus comprises converting the first coordinates of the at least partially occluded object in the first coordinate system into third coordinates in a third coordinate system; and converting the third coordinates in the third coordinate system into the second coordinates in the second coordinate system defined in the display apparatus; wherein the first coordinate system is a three-dimensional coordinate system; and the third coordinate system is a two-dimensional coordinate system on a plane substantially parallel to an imaging plane of the display apparatus.

Optionally, converting the first coordinates of the at least partially occluded object in the first coordinate system into the third coordinates in the third coordinate system is performed according to Equation (1) and Equation (2) when the imaging plane of the display apparatus is substantially parallel to a coordinate plane of the first coordinate system:

$$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane.

Optionally, the reference point is a position of a view zone of a viewer in a vehicle.

Optionally, converting the third coordinates in the third coordinate system into the second coordinates in the second coordinate system defined in the display apparatus is performed according to Equation (3) and Equation (4):

$$u = \frac{x_2}{dx} + u_0; \quad (3)$$

$$v = \frac{y_2}{dy} + v_0; \quad (4)$$

wherein (x2, y2) stands for the third coordinates; (u, v) stands for the second coordinates; ($u_0$, $v_0$) stands for a reference coordinate of a reference point in the third coordinate system; dx stands for a real distance representing a first pixel pitch along a first direction of the display apparatus; dy stands for a real distance representing a second pixel pitch along a second direction of the display apparatus.

Optionally, the reference point is a position of an orthographic projection of a view zone of a viewer in a vehicle on the imaging plane.

Optionally, the non-occluded portion of the at least partially occluded object is recognized in at least one frame from a first frame of image to an (N−1)-th frame of image; and the non-occluded portion of the at least partially occluded object is unrecognized in an N-th frame of image, N≥2; the method further comprises determining whether the at least partially occluded object is outside field of view or becomes a fully occluded object in the N-th frame of image; generating predicted second coordinates of the fully occluded object in the display apparatus corresponding to the N-th frame of image upon a determination that the at least partially occluded object is still inside field of view; and displaying the simulated image at a position having the predicted second coordinates in the display apparatus.

Optionally, the non-occluded portion of the at least partially occluded object is recognized in at least one frame of image from a first frame of image to an (N−1)-th frame of image; and the non-occluded portion of the at least partially occluded object is unrecognized in an N-th frame of image, N≥2; the method further comprises generating predicted second coordinates of the at least partially occluded object in the display apparatus corresponding to the N-th frame of image; determining whether the at least partially occluded object is outside field of view based on the predicted second coordinates; displaying the simulated image at a position having the predicted second coordinates in the display apparatus upon a determination that the at least partially occluded object is still inside field of view but becomes unrecognizable or fully occluded.

Optionally, the non-occluded portion of the at least partially occluded object is recognized from an i-th frame of image to a j-th frame of image, i<j<N; and the non-occluded portion of the at least partially occluded object is unrecognized from a (j+1)-th frame of image to an N-th frame of image, N≥4; the method further comprises generating predicted second coordinates of the at least partially occluded object in the display apparatus corresponding to the N-th frame of image according to Equation (5) and Equation (6):

$$u_n = (u_j - u_i)\frac{m_2}{m_1} + u_i; \quad (5)$$

$$v_n = (v_j - v_i)\frac{m_2}{m_1} + v_i; \quad (6)$$

wherein $(u_n, v_n)$ is the second coordinates of the at least partially occluded object in the display apparatus corresponding to the N-th frame of image; $(u_i, v_i)$ is the second coordinates of the at least partially occluded object in the display apparatus corresponding to the j-th frame of image; $m_1=j-i+1$; and $m_2=n-j$.

Optionally, the method further comprises displaying the simulated image at a position having the second coordinates in the display apparatus.

Optionally, the method further comprises obtaining the input image using a camera.

In one aspect, the present invention provides an apparatus for tracking an at least partially occluded object, comprising a memory; and one or more processors; wherein the memory and the one or more processors are connected with each other; and the memory stores computer-executable instructions for controlling the one or more processors to recognize a non-occluded portion of the at least partially occluded object in an input image; generate a simulated image of the at least partially occluded object based on features of the non-occluded portion extracted from the input image; determine first coordinates of the at least partially occluded object in a first coordinate system; and convert the first coordinates of the at least partially occluded object in the first coordinate system into second coordinates in a second coordinate system defined in a display apparatus.

Optionally, the memory further stores computer-executable instructions for controlling the one or more processors to classify the non-occluded portion using classifiers trained using extracted features of portions of a plurality of training objects; wherein the simulated image is an image of one of the plurality of training objects, a portion of which comprising extracted features closest matching the features of the non-occluded portion extracted from the input image.

Optionally, the memory further stores computer-executable instructions for controlling the one or more processors to convert the first coordinates of the at least partially occluded object in the first coordinate system into third coordinates in a third coordinate system; and convert the third coordinates in the third coordinate system into the second coordinates in the second coordinate system defined in the display apparatus; wherein the first coordinate system is a three-dimensional coordinate system; and the third coordinate system is a two-dimensional coordinate system on a plane substantially parallel to an imaging plane of the display apparatus.

Optionally, the memory further stores computer-executable instructions for controlling the one or more processors to convert the first coordinates of the at least partially occluded object in the first coordinate system into the third coordinates in the third coordinate system according to Equation (1) and Equation (2) when the imaging plane of the display apparatus is substantially parallel to a coordinate plane of the first coordinate system:

$$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane.

Optionally, the reference point is a position of a view zone of a viewer in a vehicle.

Optionally, the memory further stores computer-executable instructions for controlling the one or more processors to convert the third coordinates in the third coordinate system into the second coordinates in the second coordinate system defined in the display apparatus according to Equation (3) and Equation (4):

$$u = \frac{x_2}{dx} + u_0; \quad (3)$$

$$v = \frac{y_2}{dy} + v_0; \quad (4)$$

wherein (x2, y2) stands for the third coordinates; (u, v) stands for the second coordinates; $(u_0, v_0)$ stands for a reference coordinate of a reference point in the third coordinate system; dx stands for a real distance representing a first pixel pitch along a first direction of the display apparatus; dy stands for a real distance representing a second pixel pitch along a second direction of the display apparatus.

Optionally, the reference point is a position of an orthographic projection of a view zone of a viewer in a vehicle on the imaging plane.

Optionally, the non-occluded portion of the at least partially occluded object is recognized in at least one frame from a first frame of image to an (N−1)-th frame of image; and the non-occluded portion of the at least partially occluded object is unrecognized in an N-th frame of image, N≥2; wherein the memory further stores computer-executable instructions for controlling the one or more processors to determine whether the at least partially occluded object is outside field of view or becomes a fully occluded object in the N-th frame of image; and generate predicted second coordinates of the fully occluded object in the display apparatus corresponding to the N-th frame of image upon a determination that the at least partially occluded object is still inside field of view; wherein the apparatus further comprises a display apparatus configured to display the simulated image at a position having the predicted second coordinates in the display apparatus.

Optionally, the non-occluded portion of the at least partially occluded object is recognized in at least one frame from a first frame of image to an (N−1)-th frame of image; and the non-occluded portion of the at least partially occluded object is unrecognized in an N-th frame of image, N≥2; wherein the memory further stores computer-executable instructions for controlling the one or more processors to generate predicted second coordinates of the at least partially occluded object in the display apparatus corresponding to the N-th frame of image; and determine whether the at least partially occluded object is outside field of view based on the predicted second coordinates; wherein the apparatus further comprises a display apparatus configured to display the simulated image at a position having the predicted second coordinates in the display apparatus upon a determination that the at least partially occluded object is still inside field of view but becomes unrecognizable or fully occluded.

Optionally, the non-occluded portion of the at least partially occluded object is recognized from an i-th frame of image to a j-th frame of image, i<j<N; and the non-occluded portion of the at least partially occluded object is unrecognized from a (j+1)-th frame of image to an N-th frame of image, N≥4; wherein the memory further stores computer-executable instructions for controlling the one or more processors to generate predicted second coordinates of the at least partially occluded object in the display apparatus corresponding to the N-th frame of image according to Equation (5) and Equation (6):

$$u_n = (u_j - u_i)\frac{m_2}{m_1} + u_i; \quad (5)$$

$$v_n = (v_j - v_i)\frac{m_2}{m_1} + v_i; \quad (6)$$

wherein $(u_n, v_n)$ is the second coordinates of the at least partially occluded object in the display apparatus corresponding to the N-th frame of image; $(u_i, v_i)$ is the second coordinates of the at least partially occluded object in the display apparatus corresponding to the j-th frame of image; $m_1 = j - i + 1$; and $m_2 = n - j$.

Optionally, the apparatus further comprises a camera configured to obtain the input image.

Optionally, the apparatus further comprises a display apparatus configured to display the simulated image at a position having the second coordinates in the display apparatus.

In one aspect, the present invention provides a vehicle comprising the apparatus for tracking an at least partially occluded object described herein.

Optionally, the apparatus further comprises a camera configured to obtain the input image; wherein a distance between the camera and ground is equal to or less than a threshold distance.

Optionally, the memory further stores computer-executable instructions for controlling the one or more processors to generate an alarm signal based on a critical condition being met.

Optionally, the memory further stores computer-executable instructions for controlling the one or more processors to determine whether the critical condition is met based on information comprising a driving direction and the distance between the camera and the at least partially occluded object.

In one aspect, the present invention provides a computer-program product comprising a non-transitory tangible computer-readable medium having computer-readable instructions thereon, the computer-readable instructions being executable by a processor to cause the processor to perform recognizing a non-occluded portion of an at least partially occluded object in an input image; generating a simulated image of the at least partially occluded object based on features of the non-occluded portion extracted from the input image; determining first coordinates of the at least partially occluded object in a first coordinate system; and converting the first coordinates of the at least partially occluded object in the first coordinate system into second coordinates in a second coordinate system defined in a display apparatus.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

When a driver is driving a vehicle on a road, e.g., a multi-lane road, vehicles in adjacent lanes often obscure the driver's view. When this occurs, the object (such as a pedestrian, another vehicle, a bike, etc.) behind the vehicles in adjacent lanes is partially occluded or sometimes completely occluded by the vehicles in adjacent lanes. The driver often is not aware of the occluded object. When the occluded object subsequently moves toward the driving direction of the vehicle, an accident is prone to happen, particularly when the object is relatively close to the vehicle or moving toward a path along the driving direction.

Accordingly, the present disclosure provides, inter alia, a method for tracking an at least partially occluded object, an apparatus for tracking an at least partially occluded object, a vehicle, and a computer-program product that substantially obviate one or more of the problems due to limitations and disadvantages of the related art. In one aspect, the present disclosure provides an apparatus for tracking an at least partially occluded object. In some embodiments, the method of tracking an at least partially occluded object includes recognizing a non-occluded portion of the at least partially occluded object in an input image; generating a simulated image of the at least partially occluded object based on features of the non-occluded portion extracted from the input image; determining first coordinates of the at least partially occluded object in a first coordinate system; and converting the first coordinates of the at least partially occluded object in the first coordinate system into second coordinates in a second coordinate system defined in a display apparatus. Optionally, the first coordinate system is a coordinate system defined in a three-dimensional space. Optionally, the first coordinate system is a three-dimensional coordinate system. Optionally, the second coordinate system defined in the display apparatus is a two-dimensional coordinate system. Optionally, the second coordinate system defined in the display apparatus is a three-dimensional coordinate system.

As used herein, the term "occluded" refers to an object being partially or completely concealed by another object when viewed in a certain filed of view. As used herein, the term "non-occluded portion" of an at least partially occluded object refers to a portion of an object that is not concealed by another object when viewed in the certain filed of view.

Figure 1:
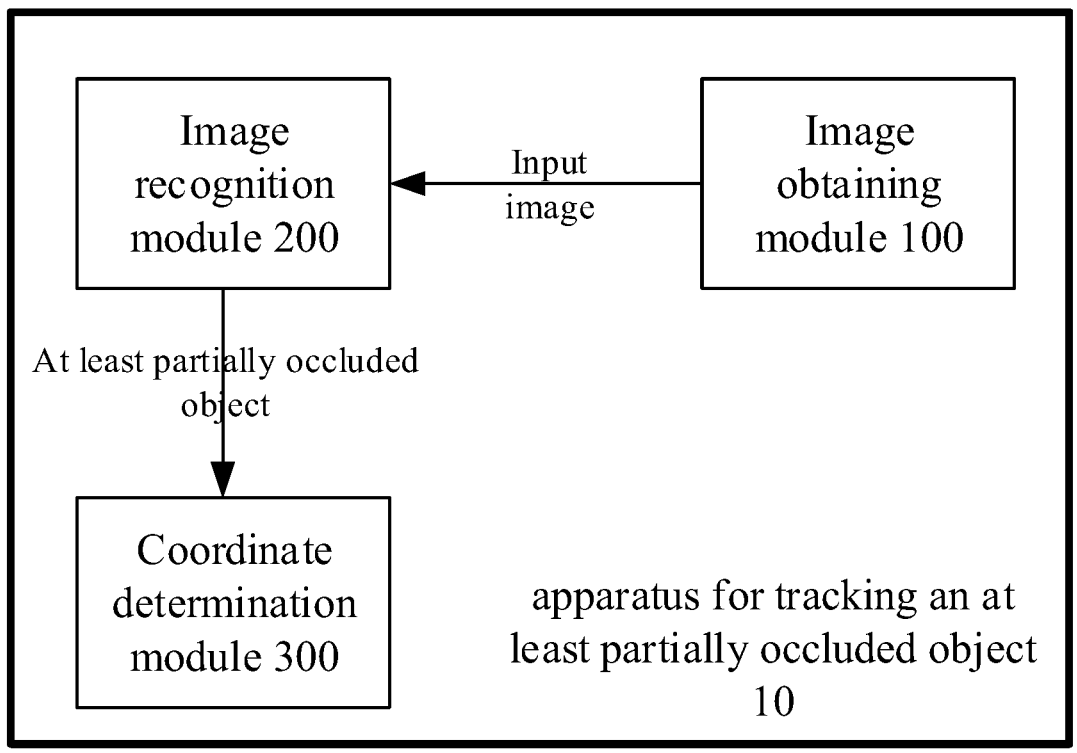
FIG. 1 is a schematic diagram illustrating an apparatus for tracking an at least partially occluded object in some embodiments according to the present disclosure.

FIG. 1 is a schematic diagram illustrating an apparatus for tracking an at least partially occluded object in some embodiments according to the present disclosure. Referring to FIG. 1, the apparatus for tracking an at least partially occluded object 10 in some embodiments includes an image obtaining module 100 configured to obtain an input image, an image recognition module 200 configured to recognize a non-occluded portion of the at least partially occluded object in an input image, and generate a simulated image of the at least partially occluded object based on features of the non-occluded portion extracted from the input image, and a coordinate determination module 300 configured to determine first coordinates of the at least partially occluded object in a first coordinate system, and convert the first coordinates of the at least partially occluded object in the first coordinate system into second coordinates in a second coordinate system defined in a display apparatus. Optionally, the coordinate determination module 300 is configured to convert the first coordinates of the at least partially occluded object in the first coordinate system into third coordinates in a third coordinate system, and convert the third coordinates in the third coordinate system into the second coordinates in the second coordinate system defined in the display apparatus. Optionally, the first coordinate system is a three-dimensional coordinate system such as a world coordinate system. Optionally, the third coordinate system is a two-dimensional coordinate system on a plane substantially parallel to an imaging plane of the display apparatus. Optionally, the imaging plane is an imaging plane of a virtual image, thus the imaging plane is a virtual imaging plane. Optionally, the imaging plane is an imaging plane of a real image.

In some embodiments, the coordinate determination module 300 is configured to classify the non-occluded portion using classifiers trained using extracted features of portions of a plurality of training objects. Optionally, the simulated image is an image of one of the plurality of training objects, a portion of which having extracted features closest matching the features of the non-occluded portion extracted from the input image. As used herein, the term "closest matching" refers to having a best or one of the best similarity measurement for one or more particular similarity measures.

In some embodiments, the coordinate determination module 300 is configured to convert the first coordinates of the at least partially occluded object in the first coordinate system into the third coordinates in the third coordinate system according to Equation (1) and Equation (2) when the imaging plane of the display apparatus is substantially parallel to a coordinate plane of the first coordinate system $$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane. Optionally, the reference point is a position of a view zone (e.g., human eyes) of a viewer (e.g., the driver) in a vehicle. Optionally, f can be expressed as a distance between an orthographic projection of the imaging surface on a coordinate axis in the first coordinate system perpendicular to the imaging surface and an orthographic projection of the reference point on the coordinate axis in the first coordinate system perpendicular to the imaging surface; and l can be expressed as a distance between an orthographic projection of the at least partially occluded object on the coordinate axis in the first coordinate system perpendicular to the imaging surface and the orthographic projection of the reference point on the coordinate axis in the first coordinate system perpendicular to the imaging surface.

In some embodiments, the coordinate determination module 300 is configured to convert the third coordinates in the third coordinate system into the second coordinates in the second coordinate system defined in the display apparatus according to Equation (3) and Equation (4):

$$u = \frac{x_2}{dx} + u_0; \quad (3)$$

$$v = \frac{y_2}{dy} + v_0; \quad (4)$$

wherein (x2, y2) stands for the third coordinates; (u, v) stands for the second coordinates; $(u_0, v_0)$ stands for a reference coordinate of a reference point in the third coordinate system; dx stands for a real distance representing a first pixel pitch along a first direction (e.g., a row direction) of the display apparatus; dy stands for a real distance representing a second pixel pitch along a second direction (e.g., a column direction) of the display apparatus. Optionally, the reference point is a position of an orthographic projection of a view zone of a viewer in a vehicle on the imaging plane. Optionally, dx can be expressed as a real distance representing a size of a pixel along the first direction (e.g., the row direction) of the display apparatus; and dy stands for a real distance representing a size of a pixel along the second direction (e.g., the column direction) of the display apparatus.

In some embodiments, the non-occluded portion of the at least partially occluded object is recognized in at least one frame from a first frame of image to an (N−1)-th frame of image; and the non-occluded portion of the at least partially occluded object is unrecognized in an N-th frame of image, N≥2. Optionally, the coordinate determination module 300 is configured to determine whether the at least partially occluded object is outside field of view or becomes a fully occluded object in the N-th frame of image; and generate predicted second coordinates of the fully occluded object in the display apparatus corresponding to the N-th frame of image upon a determination that the at least partially occluded object is still inside field of view. Optionally, the apparatus further includes a display apparatus configured to display the simulated image at a position having the predicted second coordinates in the display apparatus. As used herein, the term "field of view" refers to an extent of three-dimensional space covered and "viewed" by a view zone, e.g., an image obtaining module such as a camera, a human eye, etc.

In some embodiments, the non-occluded portion of the at least partially occluded object is recognized in at least one frame from a first frame of image to an (N−1)-th frame of image; and the non-occluded portion of the at least partially occluded object is unrecognized in an N-th frame of image, N≥2. Optionally, the coordinate determination module 300 is configured to generate predicted second coordinates of the at least partially occluded object in the display apparatus corresponding to the N-th frame of image; and determine whether the at least partially occluded object is outside field of view based on the predicted second coordinates. Optionally, the apparatus further includes a display apparatus configured to display the simulated image at a position having the predicted second coordinates in the display apparatus upon a determination that the at least partially occluded object is still inside field of view but becomes unrecognizable or fully occluded.

In some embodiments, the non-occluded portion of the at least partially occluded object is recognized from an i-th frame of image to a j-th frame of image, i<j<N; and the non-occluded portion of the at least partially occluded object is unrecognized from a (j+1)-th frame of image to an N-th frame of image. Optionally, N≥4. Optionally, the coordinate determination module 300 is configured to generate predicted second coordinates of the at least partially occluded object in the display apparatus corresponding to the N-th frame of image according to Equation (5) and Equation (6):

$$u_n = (u_j - u_i)\frac{m_2}{m_1} + u_i; \quad (5)$$

$$v_n = (v_j - v_i)\frac{m_2}{m_1} + v_i; \quad (6)$$

wherein $(u_n, v_n)$ is the second coordinates of the at least partially occluded object in the display apparatus corresponding to the N-th frame of image; $(u_i, v_i)$ is the second coordinates of the at least partially occluded object in the display apparatus corresponding to the j-th frame of image; $m_1$=j−i+1; and $m_2$=n−j. Optionally, the apparatus further includes a camera (e.g., a video camera) configured to obtain the input image. Optionally, the apparatus further includes a display apparatus configured to display the simulated image at a position having the second coordinates in the display apparatus. Optionally, the camera is a monocular camera. Optionally, the camera is a binocular camera.

Figure 2:
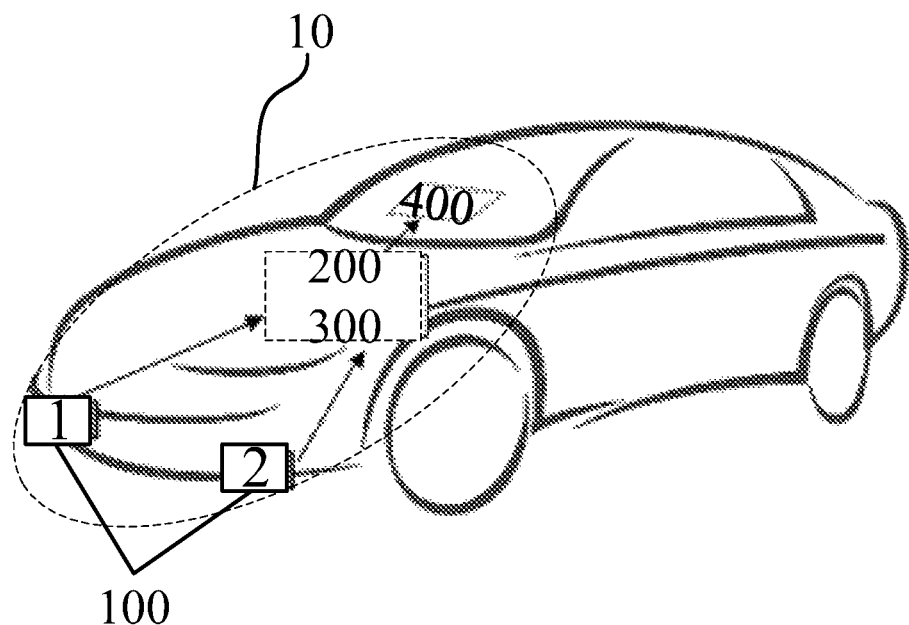
FIG. 2 is a schematic diagram illustrating a vehicle having an apparatus for tracking an at least partially occluded object in some embodiments according to the present disclosure.

FIG. 2 is a schematic diagram illustrating a vehicle having an apparatus for tracking an at least partially occluded object in some embodiments according to the present disclosure. In some embodiments, the apparatus for tracking an at least partially occluded object in some embodiments is installed in a vehicle. Optionally, the viewer is a driver of the vehicle. Optionally, the view zone is one or both eyes of the driver. Referring to FIG. 2, the apparatus for tracking an at least partially occluded object 10 in some embodiments includes an image obtaining module 100, an image recognition module 200, a coordinate determination module 300, and a display apparatus 400. The image obtaining module 100 can be installed at any appropriate position of the vehicle. For example, the image obtaining module 100 (e.g., one or more cameras) can be installed on one or both sides of the vehicle. In another example, the image obtaining module 100 (e.g., one or more cameras) can be installed on a chassis of the vehicle. Optionally, the image obtaining module 100 can be installed at one or both of a position 1 and a position 2 of the vehicle. For example, the position 1 is at right front of the vehicle, and the position 2 is at left front of the vehicle. The at least partially occluded object may be an object at least partially occluded by an obstacle (e.g., a nearby vehicle). Accordingly, the image obtaining module 100 is disposed at a position so that the image obtaining module 100 can capture a non-occluded portion of the at least partially occluded object even though the at least partially occluded object is completely or partially absent in the driver's field of view. For example, the image obtaining module 100 has a field of view different from the driver's field of view. Optionally, the image obtaining module 100 is disposed at a position relatively close to ground as compared to the driver's eyes. In one example, the image obtaining module 100 is disposed at a front side of the vehicle. In another example the image obtaining module 100 is disposed on the chassis close to the front of the vehicle. Optionally, a distance between the image obtaining module 100 and ground is equal to or less than a threshold distance. Optionally, the distance between the image obtaining module 100 and ground less than a distance between the viewer's view zone (e.g., the driver's eyes) and ground.

In some embodiments, the coordinate determination module 300 is configured to determine whether the critical condition is met. Optionally, the determination is based on information including a driving direction of the vehicle and a distance between the camera and the at least partially occluded object. Optionally, the coordinate determination module 300 is configured to generate an alarm signal based on the critical condition being met. Optionally, the vehicle includes an alarm device, and upon receiving the alarm signal, the alarm device generates an alarm to a driver. Optionally, the alarm includes one or a combination of a textual alarm, a visual alarm, and an audio alarm.

Figure 3:
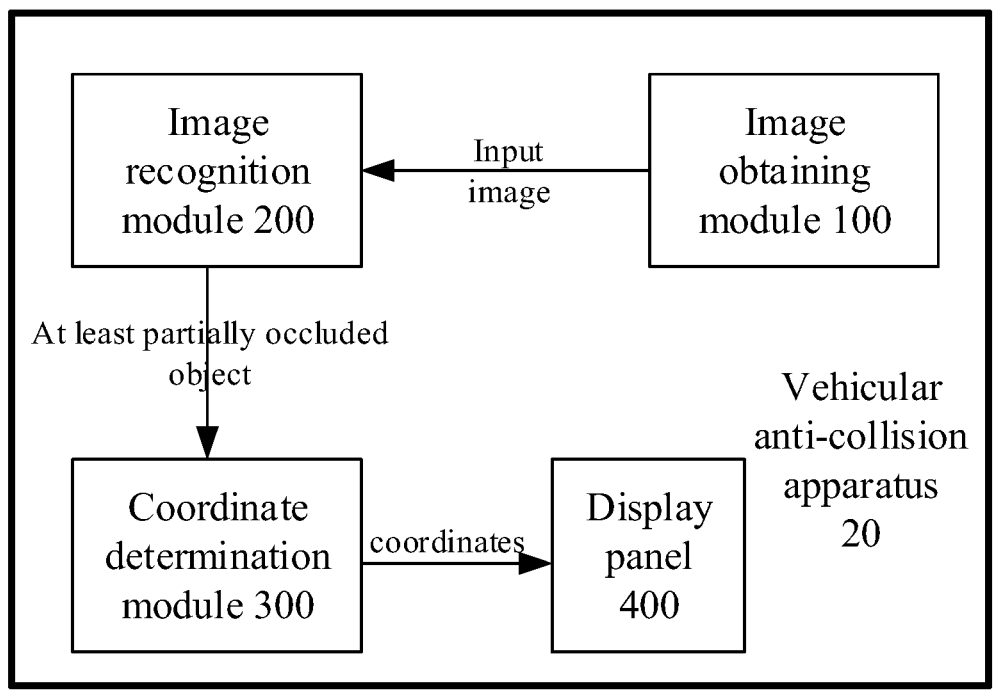
FIG. 3 is a schematic diagram illustrating a vehicular anti-collision apparatus in some embodiments according to the present disclosure.

FIG. 3 is a schematic diagram illustrating a vehicular anti-collision apparatus in some embodiments according to the present disclosure. Referring to FIG. 3, the vehicular anti-collision apparatus 20 in some embodiments includes an image obtaining module 100, an image recognition module 200, a coordinate determination module 300, and a display apparatus 400.

In some embodiments, the apparatus for tracking an at least partially occluded object includes a memory; and one or more processors. The memory and the one or more processors are connected with each other; and the memory stores computer-executable instructions for controlling the one or more processors to recognize a non-occluded portion of the at least partially occluded object in an input image; generate a simulated image of the at least partially occluded object based on features of the non-occluded portion extracted from the input image; determine first coordinates of the at least partially occluded object in a first coordinate system; and convert the first coordinates of the at least partially occluded object in the first coordinate system into second coordinates in a second coordinate system defined in a display apparatus.

In some embodiments, the memory further stores computer-executable instructions for controlling the one or more processors to classify the non-occluded portion using classifiers trained using extracted features of portions of a plurality of training objects. Optionally, the simulated image is an image of one of the plurality of training objects, a portion of which comprising extracted features closest matching the features of the non-occluded portion extracted from the input image.

In some embodiments, the memory further stores computer-executable instructions for controlling the one or more processors to convert the first coordinates of the at least partially occluded object in the first coordinate system into third coordinates in a third coordinate system; and convert the third coordinates in the third coordinate system into the second coordinates in the second coordinate system defined in the display apparatus. Optionally, the first coordinate system is a three-dimensional coordinate system, e.g., a world coordinate system. Optionally, the third coordinate system is a two-dimensional coordinate system on a plane substantially parallel to an imaging plane of the display apparatus. Optionally, the imaging plane is an imaging plane of a virtual image, thus the imaging plane is a virtual imaging plane. Optionally, the imaging plane is an imaging plane of a real image.

In some embodiments, the memory further stores computer-executable instructions for controlling the one or more processors to convert the first coordinates of the at least partially occluded object in the first coordinate system into the third coordinates in the third coordinate system according to Equation (1) and Equation (2) when the imaging plane of the display apparatus is substantially parallel to a coordinate plane of the first coordinate system:

$$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane. Optionally, the reference point is a position of a view zone (e.g., human eyes) of a viewer (e.g., the driver) in a vehicle. Optionally, f can be expressed as a distance between an orthographic projection of the imaging surface on a coordinate axis in the first coordinate system perpendicular to the imaging surface and an orthographic projection of the reference point on the coordinate axis in the first coordinate system perpendicular to the imaging surface; and l can be expressed as a distance between an orthographic projection of the at least partially occluded object on the coordinate axis in the first coordinate system perpendicular to the imaging surface and the orthographic projection of the reference point on the coordinate axis in the first coordinate system perpendicular to the imaging surface.

In some embodiments, the memory further stores computer-executable instructions for controlling the one or more processors to convert the third coordinates in the third coordinate system into the second coordinates in the second coordinate system defined in the display apparatus according to Equation (3) and Equation (4):

$$u = \frac{x_2}{dx} + u_0; \quad (3)$$

$$v = \frac{y_2}{dy} + v_0; \quad (4)$$

wherein (x2, y2) stands for the third coordinates; (u, v) stands for the second coordinates; ($u_0$, $v_0$) stands for a reference coordinate of a reference point in the third coordinate system; dx stands for a real distance representing a first pixel pitch along a first direction (e.g., a row direction) of the display apparatus; dy stands for a real distance representing a second pixel pitch along a second direction (e.g., a column direction) of the display apparatus. Optionally, the reference point is a position of an orthographic projection of a view zone of a viewer in a vehicle on the imaging plane. Optionally, dx can be expressed as a real distance representing a size of a pixel along the first direction (e.g., the row direction) of the display apparatus; and dy stands for a real distance representing a size of a pixel along the second direction (e.g., the column direction) of the display apparatus.

In some embodiments, the non-occluded portion of the at least partially occluded object is recognized in at least one frame from a first frame of image to an (N–1)-th frame of image; and the non-occluded portion of the at least partially occluded object is unrecognized in an N-th frame of image, N≥2. Optionally, the memory further stores computer-executable instructions for controlling the one or more processors to determine whether the at least partially occluded object is outside field of view or becomes a fully occluded object in the N-th frame of image; and generate predicted second coordinates of the fully occluded object in the display apparatus corresponding to the N-th frame of image upon a determination that the at least partially occluded object is still inside field of view. Optionally, the apparatus further includes a display apparatus configured to display the simulated image at a position having the predicted second coordinates in the display apparatus.

In some embodiments, the non-occluded portion of the at least partially occluded object is recognized in at least one frame from a first frame of image to an (N−1)-th frame of image; and the non-occluded portion of the at least partially occluded object is unrecognized in an N-th frame of image, N≥2. Optionally, the memory further stores computer-executable instructions for controlling the one or more processors to generate predicted second coordinates of the at least partially occluded object in the display apparatus corresponding to the N-th frame of image; and determine whether the at least partially occluded object is outside field of view based on the predicted second coordinates. Optionally, the apparatus further includes a display apparatus configured to display the simulated image at a position having the predicted second coordinates in the display apparatus upon a determination that the at least partially occluded object is still inside field of view but becomes unrecognizable or fully occluded.

In some embodiments, the non-occluded portion of the at least partially occluded object is recognized from an i-th frame of image to a j-th frame of image, i<j<N; and the non-occluded portion of the at least partially occluded object is unrecognized from a (j+1)-th frame of image to an N-th frame of image. Optionally, N≥4. Optionally, the memory further stores computer-executable instructions for controlling the one or more processors to generate predicted second coordinates of the at least partially occluded object in the display apparatus corresponding to the N-th frame of image according to Equation (5) and Equation (6):

$$u_n = (u_j - u_i)\frac{m_2}{m_1} + u_i;\quad(5)$$

$$v_n = (v_j - v_i)\frac{m_2}{m_1} + v_i;\quad(6)$$

wherein $(u_n, v_n)$ is the second coordinates of the at least partially occluded object in the display apparatus corresponding to the N-th frame of image; $(u_i, v_i)$ is the second coordinates of the at least partially occluded object in the display apparatus corresponding to the j-th frame of image; $m_1=j-i+1$; and $m_2=n-j$. Optionally, the apparatus further includes a camera configured to obtain the input image. Optionally, the apparatus further includes a display apparatus configured to display the simulated image at a position having the second coordinates in the display apparatus.

In some embodiments, the memory further stores computer-executable instructions for controlling the one or more processors to determine whether the critical condition is met. Optionally, the determination is based on information including a driving direction of the vehicle and a distance between the camera and the at least partially occluded object. Optionally, the memory further stores computer-executable instructions for controlling the one or more processors to generate an alarm signal based on the critical condition being met. Optionally, a vehicle having the apparatus for tracking an at least partially occluded object further includes an alarm device, and upon receiving the alarm signal, the alarm device generates an alarm to a driver. Optionally, the alarm includes one or a combination of a textual alarm, a visual alarm, and an audio alarm.

Figure 4:
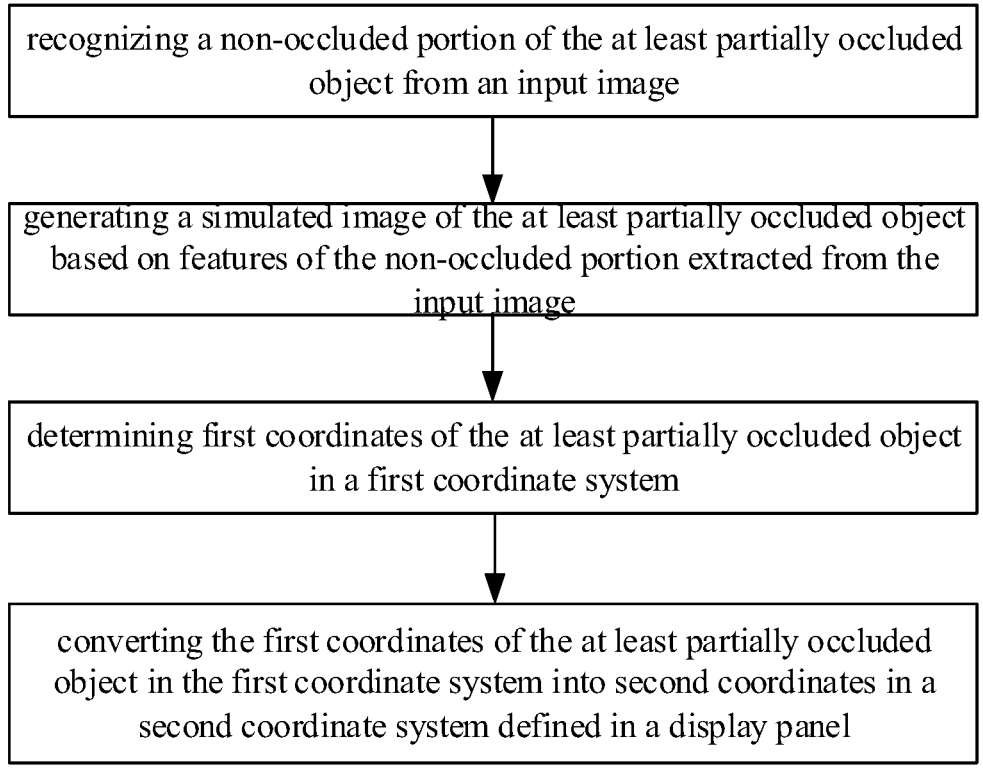
FIG. 4 is a flow chart illustrating a method for tracking an at least partially occluded object in some embodiments according to the present disclosure.

In another aspect, the present disclosure provides a method for tracking an at least partially occluded object. FIG. 4 is a flow chart illustrating a method for tracking an at least partially occluded object in some embodiments according to the present disclosure. Referring to FIG. 4, the method in some embodiments includes recognizing a non-occluded portion of the at least partially occluded object in an input image; generating a simulated image of the at least partially occluded object based on features of the non-occluded portion extracted from the input image; determining first coordinates of the at least partially occluded object in a first coordinate system; and converting the first coordinates of the at least partially occluded object in the first coordinate system into second coordinates in a second coordinate system defined in a display apparatus. Optionally, the first coordinate system is a coordinate system defined in a three-dimensional space. Optionally, the first coordinate system is a three-dimensional coordinate system. Optionally, the second coordinate system defined in the display apparatus is a two-dimensional coordinate system. Optionally, the second coordinate system defined in the display apparatus is a three-dimensional coordinate system.

In some embodiments, the method further includes obtaining the input image using an image obtaining module (e.g., a camera). In some embodiments, the method further includes determining a distance between the image obtaining module (e.g., a camera) and the at least partially occluded object. Optionally, the method further includes determining whether a critical condition is met. Optionally, the determination is based on information including a driving direction of the vehicle and the distance between the image obtaining module and the at least partially occluded object. Optionally, the method further includes generating an alarm signal based on the critical condition being met. Optionally, the distance between the image obtaining module and the at least partially occluded object is determined using an image obtained by a binocular camera.

The image obtaining module can be installed in any appropriate position of the vehicle. For example, the image obtaining module (e.g., one or more cameras) can be installed on one or both sides of the vehicle. In another example, the image obtaining module (e.g., one or more cameras) can be installed on a chassis of the vehicle. Optionally, the image obtaining module can be installed at one or both of a right front position of the vehicle and a left front position of the vehicle. The at least partially occluded object may be an object at least partially occluded by an obstacle (e.g., a nearby vehicle). Accordingly, the image obtaining module is disposed at a position so that the image obtaining module can capture a non-occluded portion of the at least partially occluded object even though the at least partially occluded object is completely or partially absent in the driver's field of view. For example, the image obtaining module has a field of view different from the driver's field of view. Optionally, the image obtaining module is disposed at a position relatively close to ground as compared to the driver's eyes. In one example, the image obtaining module is disposed at a front side of the vehicle. In another example the image obtaining module is disposed on the chassis close to the front of the vehicle. Optionally, a distance between the image obtaining module and ground is equal to or less than a threshold distance. Optionally, the distance between the image obtaining module and ground less than a distance between the viewer's view zone (e.g., the driver's eyes) and ground.

The at least partially occluded object may be any appropriate object such as a human, an animal, or any other types of objects (e.g., a wheel of a vehicle).

Figure 5:
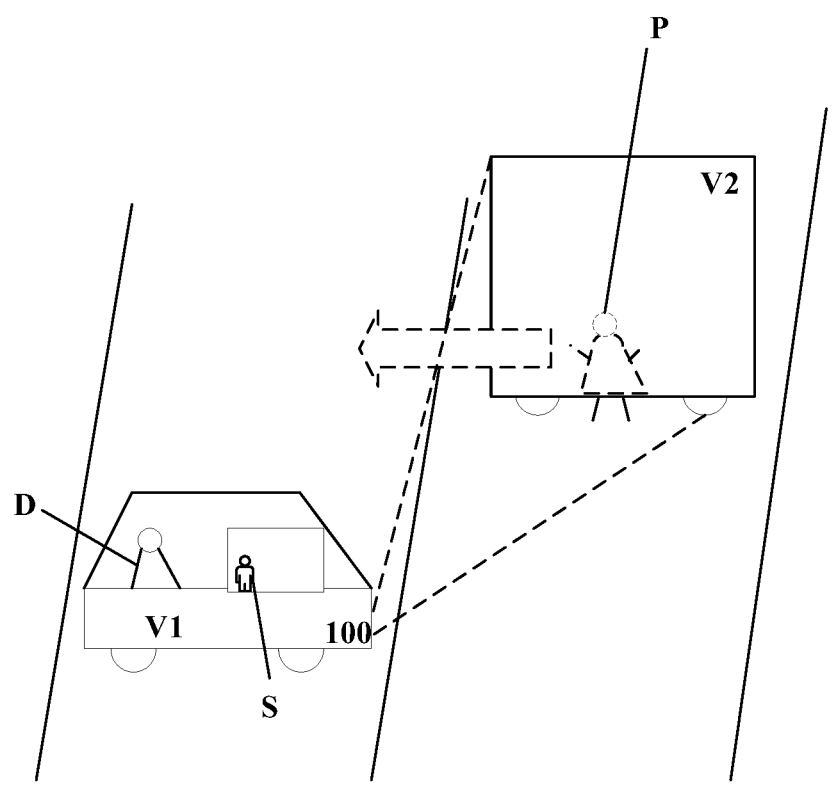
FIG. 5 illustrates a process of generating a simulated image of an at least partially occluded object in some embodiments according to the present disclosure.

In some embodiments, the non-occluded portion of the at least partially occluded object in the input image is recognized using a deep learning method. In some embodiments, the step of generating the simulated image of the at least partially occluded object includes classifying the non-occluded portion using classifiers trained using extracted features of portions of a plurality of training objects. Optionally, the simulated image is an image of one of the plurality of training objects, a portion of which including extracted features closest matching the features of the non-occluded portion extracted from the input image. Optionally, the simulated image In some embodiments, the features of the non-occluded portion extracted from the input image includes a contour of the non-occluded portion of the at least partially occluded object, and the contour of the non-occluded portion of the at least partially occluded object is classified using contours of portions of a plurality of training objects. A contour of a portion of the plurality of training objects is found to have the closest match with the contour of the non-occluded portion of the at least partially occluded object. The image of the one of the training objects having the portion whose contour has the closest match is chosen as the simulated image. In one example, a contour image of the one of the training objects having the portion whose contour has the closest match is chosen as the simulated image. FIG. 5 illustrates a process of generating a simulated image of an at least partially occluded object in some embodiments according to the present disclosure. Referring to FIG. 5, a driver D is driving a first vehicle V1, and a pedestrian is partially occluded by a nearby vehicle V2. The lower body of the pedestrian P is not occluded in the field of view of an image obtaining module 100. An input image is obtained by the image obtaining module 100. A non-occluded portion (e.g., the lower body) of the at least partially occluded object (e.g., the pedestrian P) is recognized in the input image. The contour of the non-occluded portion, e.g., the contour of the lower part, is classified using contours of portions of a plurality of training objects, and is classified as a contour of a lower part of a human. Based on this classification, a simulated image S of a human (e.g., a contour image of a human) is generated and displayed in a display apparatus in vehicle V1. By recognizing the non-occluded portion of the at least partially occluded object and generating the simulated image of the at least partially occluded object, the driver D can be aware of the at least partially occluded object (e.g., the pedestrian P behind the nearby vehicle V2), even though the at least partially occluded object is completely outside the driver D's field of view. Because the driver becomes aware of the presence of the at least partially occluded object (e.g., the pedestrian P), and the movement of the at least partially occluded object can be tracked, potential accidents such as a collision with the pedestrian can be avoided when the pedestrian is moving toward the vehicle V1. The present method greatly improves driving safety.

Any appropriate display apparatus may be used in the present method. Optionally, the display apparatus is a head-up display. Optionally, the display apparatus includes a projection device. Optionally, the display apparatus is an augmented display apparatus. Optionally, the display apparatus is a virtual reality display apparatus.

In some embodiments, the head-up display includes a display unit and an imaging optical system. Optionally, the display unit is configured to display vehicle status information such as vehicle speed and fuel level, as well as navigation information and alarm indication information. Optionally, the imaging optical system is configured to reflect light emitted by the display unit onto the windshield of the vehicle, and the windshield is configured to subsequently reflected to light to a view zone of a viewer (e.g., the driver's eyes), thereby generating a virtual image on an imaging plane. The driver can observe the virtual image through the windshield.

Optionally, the display unit includes a back light module and a display panel. Optionally, the display panel is configured to display image information transmitted from the electronic control unit of the vehicle, e.g., the vehicle status information such as vehicle speed and fuel level, as well as navigation information and alarm indication information. The back light module is configured to provide back light to the display panel.

Various appropriate imaging optical system may be used in the present display apparatus. In one example, the imaging optical system includes one or a combination of a reflective mirror, a transflective mirror, and a prism. Optionally, the imaging optical system includes a reflective mirror, this type of imaging optical system saves space.

In some embodiments, the second coordinates refer to coordinates of a designated point of the simulated image of the at least partially occluded object in the second coordinate system defined in a display apparatus. The designated point may be any appropriate point. In one example, the designated point is a point in the simulated image corresponding to a central point of the at least partially occluded object. In another example, the designated point is a point in the simulated image corresponding to a mass center of the at least partially occluded object. For example, a second coordinate (1, 1) in the second coordinate system indicates the designated point is at a pixel in a first row and a first column of the display apparatus. In another example, a second coordinate (3, 4) in the second coordinate system indicates the designated point is at a pixel in a third row and a fourth column of the display apparatus.

Figure 6:
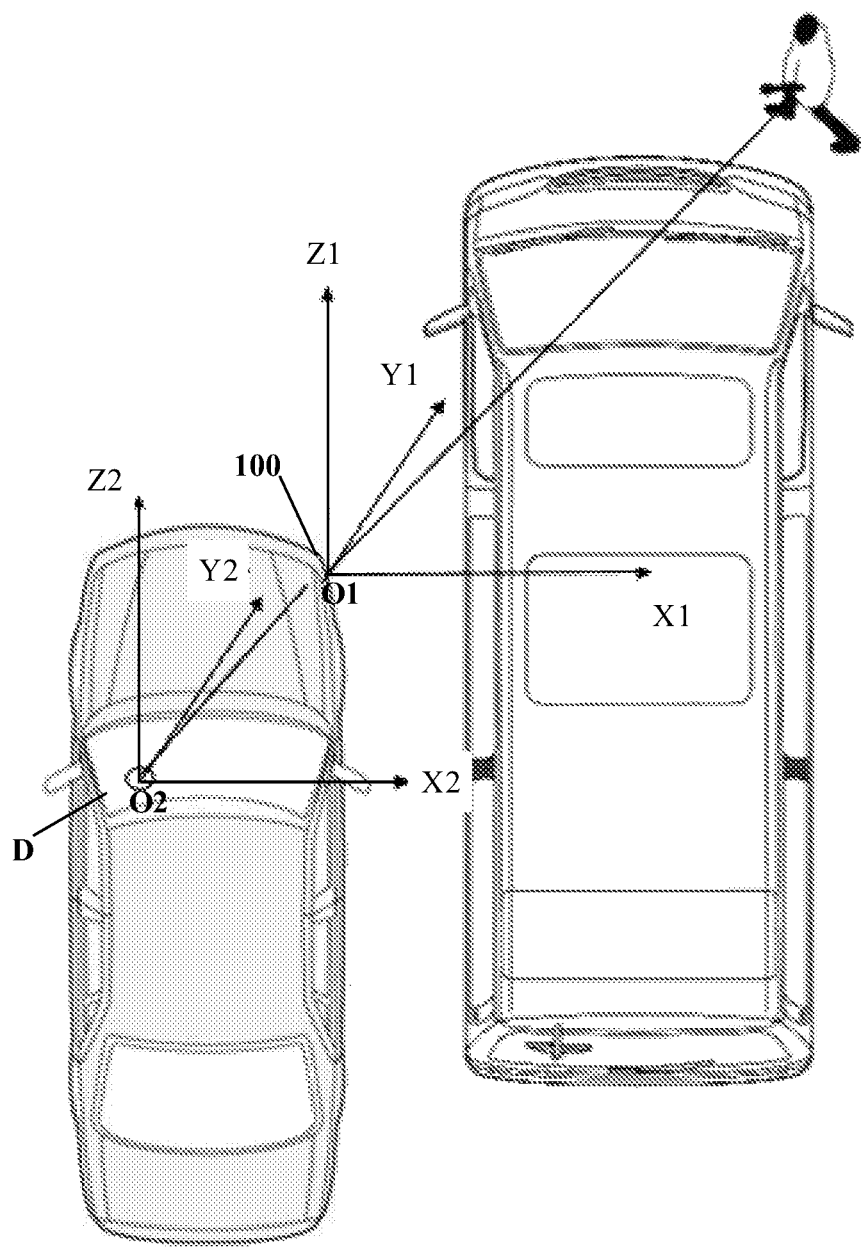
FIG. 6 illustrates coordinate systems for tracking an at least partially occluded object in some embodiments according to the present disclosure.

In some embodiments, the first coordinate system is a three-dimensional coordinate system, e.g., a world coordinate system. Optionally, the first coordinate system is a pre-set coordinate system. Optionally, the first coordinate system is an image obtaining module coordinate system, e.g., a camera coordinate system. FIG. 6 illustrates coordinate systems for tracking an at least partially occluded object in some embodiments according to the present disclosure. Referring to FIG. 6, the first coordinate system in some embodiments is an image obtaining module coordinate system depicted using X1, Y1, and Z1 axes, e.g., a three-dimensional coordinate system. As shown in FIG. 6, the origin O1 of the image obtaining module coordinate system is the position of the image obtaining module 100. Optionally, the X1-O1-Y1 plane is perpendicular to the horizontal plane. The Z1 axis of the image obtaining module coordinate system is parallel to the horizontal plane.

Optionally, when the first coordinate system is the image obtaining module coordinate system, e.g., the camera coordinate system, the first coordinates of the at least partially occluded object in a first coordinate system can be determined directly. Optionally, when the first coordinate system is the image obtaining module coordinate system, e.g., the camera coordinate system, a distance between the image obtaining module and the at least partially occluded object can be first determined, and the first coordinates of the at least partially occluded object in a first coordinate system can be determined based on the distance between the image obtaining module and the at least partially occluded object.

Alternatively, the first coordinate system is a driver coordinate system depicted using X2, Y2, and Z2 axes. Referring to FIG. 6, the first coordinate system in some embodiments is a driver coordinate system. The origin O2 of the driver coordinate system is the position of the driver D. Optionally, the X2-O2-Y2 plane is perpendicular to the horizontal plane. The Z2 axis of the driver coordinate system is parallel to the horizontal plane.

Optionally, when the first coordinate system is a coordinate system other than the image obtaining module coordinate system, coordinates of the at least partially occluded object in the image obtaining module coordinate system can be first determined, followed by converting the coordinates of the at least partially occluded object in the image obtaining module coordinate system into the first coordinates in the first coordinate system.

In some embodiments, the step of converting the first coordinates of the at least partially occluded object in the first coordinate system into the second coordinates in the second coordinate system defined in the display apparatus includes converting the first coordinates of the at least partially occluded object in the first coordinate system into third coordinates in a third coordinate system; and converting the third coordinates in the third coordinate system into the second coordinates in the second coordinate system defined in the display apparatus. Optionally, the first coordinate system is a three-dimensional coordinate system, and the third coordinate system is a two-dimensional coordinate system on a plane substantially parallel to an imaging plane of the display apparatus. Optionally, the imaging plane is an imaging plane of a virtual image, thus the imaging plane is a virtual imaging plane. Optionally, the imaging plane is an imaging plane of a real image.

Figure 7:
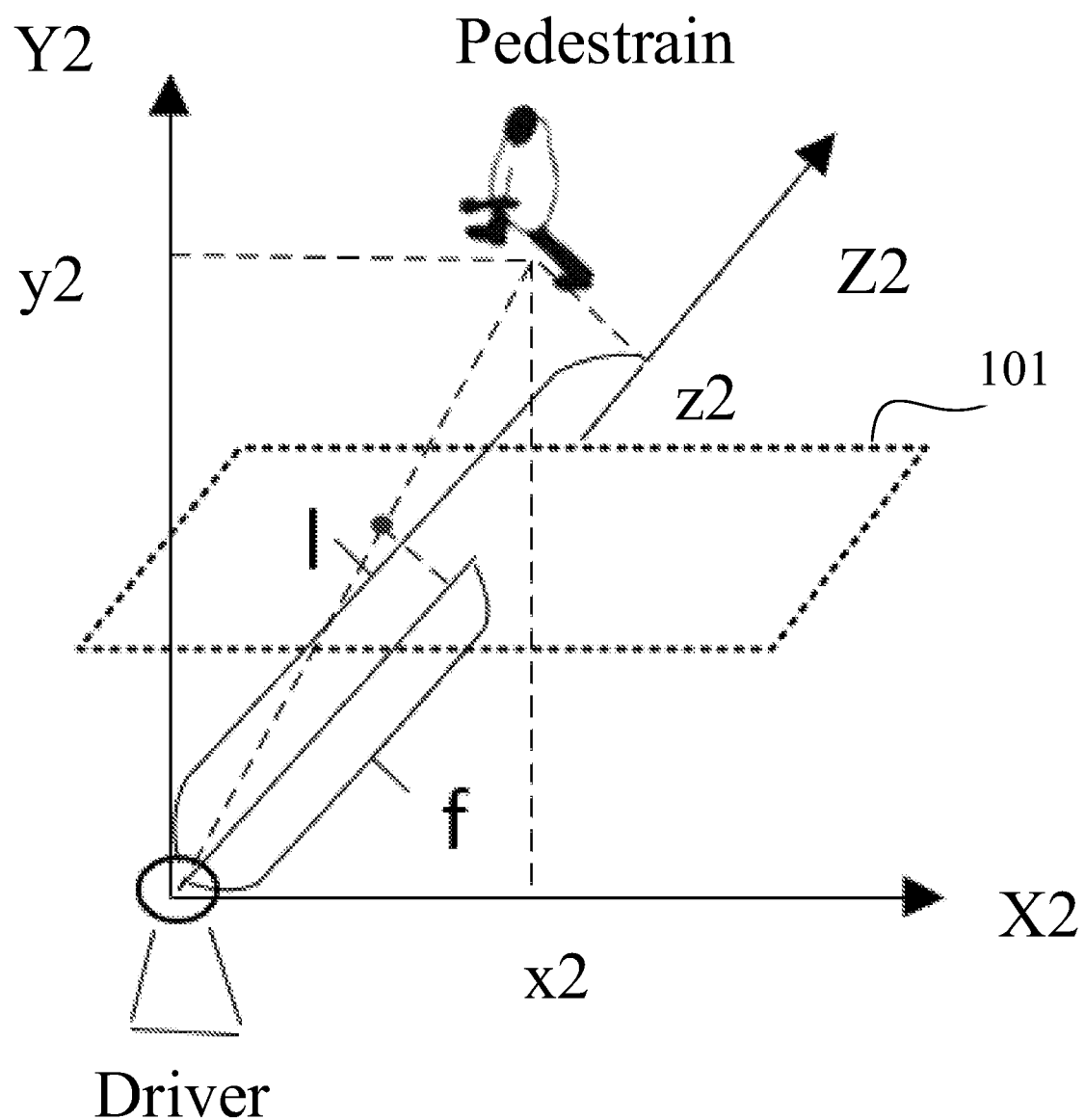
FIG. 7 illustrates an imaging plane of a display apparatus and an at least partially occluded object in a coordinate system in some embodiments according to the present disclosure.

FIG. 7 illustrates an imaging plane of a display apparatus and an at least partially occluded object in a coordinate system in some embodiments according to the present disclosure. Referring to FIG. 7, the third coordinate system 101 is a two-dimensional coordinate system on a plane substantially parallel to an imaging plane of the display apparatus. Typically, the third coordinate system 101 is on a plane perpendicular to the horizontal plane. Any appropriate point in the third coordinate system 101 may be used as the origin of the third coordinate system 101. In some embodiments, the first coordinates of the at least partially occluded object in the first coordinate system can be first converted into third coordinates in a third coordinate system 101. Subsequently, the third coordinates in the third coordinate system 101 can be converted into the second coordinates in the second coordinate system defined in the display apparatus. Optionally, the third coordinate system 101 is on a plane parallel to a coordinate axis of the first coordinate system. For example, in FIG. 7, the third coordinate system 101 is on a plane parallel to the X2-O2-Y2 plane of the first coordinate system (which is a driver coordinate system). Optionally, the third coordinate system 101 is on a plane non-parallel to any coordinate plane of the first coordinate system.

In some embodiments, the imaging plane of the display apparatus is substantially parallel to a coordinate plane of the first coordinate system, e.g., the third coordinate system 101 is on a plane parallel to the X2-O2-Y2 coordinate plane of the first coordinate system. Optionally, the step of converting the first coordinates of the at least partially occluded object in the first coordinate system into the third coordinates in the third coordinate system is performed according to Equation (1) and Equation (2):

$$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane. Optionally, the reference point is a position of a view zone (e.g., human eyes) of a viewer (e.g., the driver) in a vehicle. Optionally, f can be expressed as a distance between an orthographic projection of the imaging surface on a coordinate axis in the first coordinate system perpendicular to the imaging surface and an orthographic projection of the reference point on the coordinate axis in the first coordinate system perpendicular to the imaging surface; and l can be expressed as a distance between an orthographic projection of the at least partially occluded object on the coordinate axis in the first coordinate system perpendicular to the imaging surface and the orthographic projection of the reference point on the coordinate axis in the first coordinate system perpendicular to the imaging surface.

In some embodiments, the step of converting the third coordinates in the third coordinate system into the second coordinates in the second coordinate system defined in the display apparatus is performed according to Equation (3) and Equation (4):

$$u = \frac{x_2}{dx} + u_0; \quad (3)$$

$$v = \frac{y_2}{dy} + v_0; \quad (4)$$

wherein (x2, y2) stands for the third coordinates; (u, v) stands for the second coordinates; ($u_0$, $v_0$) stands for a reference coordinate of a reference point in the third coordinate system; dx stands for a real distance representing a first pixel pitch along a first direction (e.g., a row direction) of the display apparatus; dy stands for a real distance representing a second pixel pitch along a second direction (e.g., a column direction) of the display apparatus. Optionally, the reference point is a position of an orthographic projection of a view zone of a viewer in a vehicle on the imaging plane. Optionally, dx can be expressed as a real distance representing a size of a pixel along the first direction (e.g., the row direction) of the display apparatus; and dy stands for a real distance representing a size of a pixel along the second direction (e.g., the column direction) of the display apparatus.

In some embodiments, the method further includes displaying the simulated image at a position having the second coordinates in the display apparatus. In some embodiments, the second coordinates displayed in the display apparatus refer to coordinates of a designated point of the simulated image of the at least partially occluded object in the second coordinate system defined in a display apparatus. The designated point may be any appropriate point. In one example, the designated point is a point in the simulated image corresponding to a central point of the at least partially occluded object. In another example, the designated point is a point in the simulated image corresponding to a mass center of the at least partially occluded object. For example, a second coordinate (1, 1) in the second coordinate system indicates the designated point is at a pixel in a first row and a first column of the display apparatus. In another example, a second coordinate (3, 4) in the second coordinate system indicates the designated point is at a pixel in a third row and a fourth column of the display apparatus.

In some embodiments, the image obtaining module is configured to obtain a plurality of frames of images, and the input image is one of the plurality of frames of images. Optionally, in one or more of the plurality of frames of images, the at least partially occluded object is unrecognized. For example, the at least partially occluded object has moved outside field of view of the image obtaining module or has become fully occluded. Optionally, the at least partially occluded object in the one or more of the plurality of frames of images where it is unrecognized can be tracked based on information obtained in one or more of the plurality of frames of images where the at least partially occluded object is recognized. By tracking the at least partially occluded object throughout all frames of images, the movement of the at least partially occluded object can be monitored more accurately.

Figure 8:
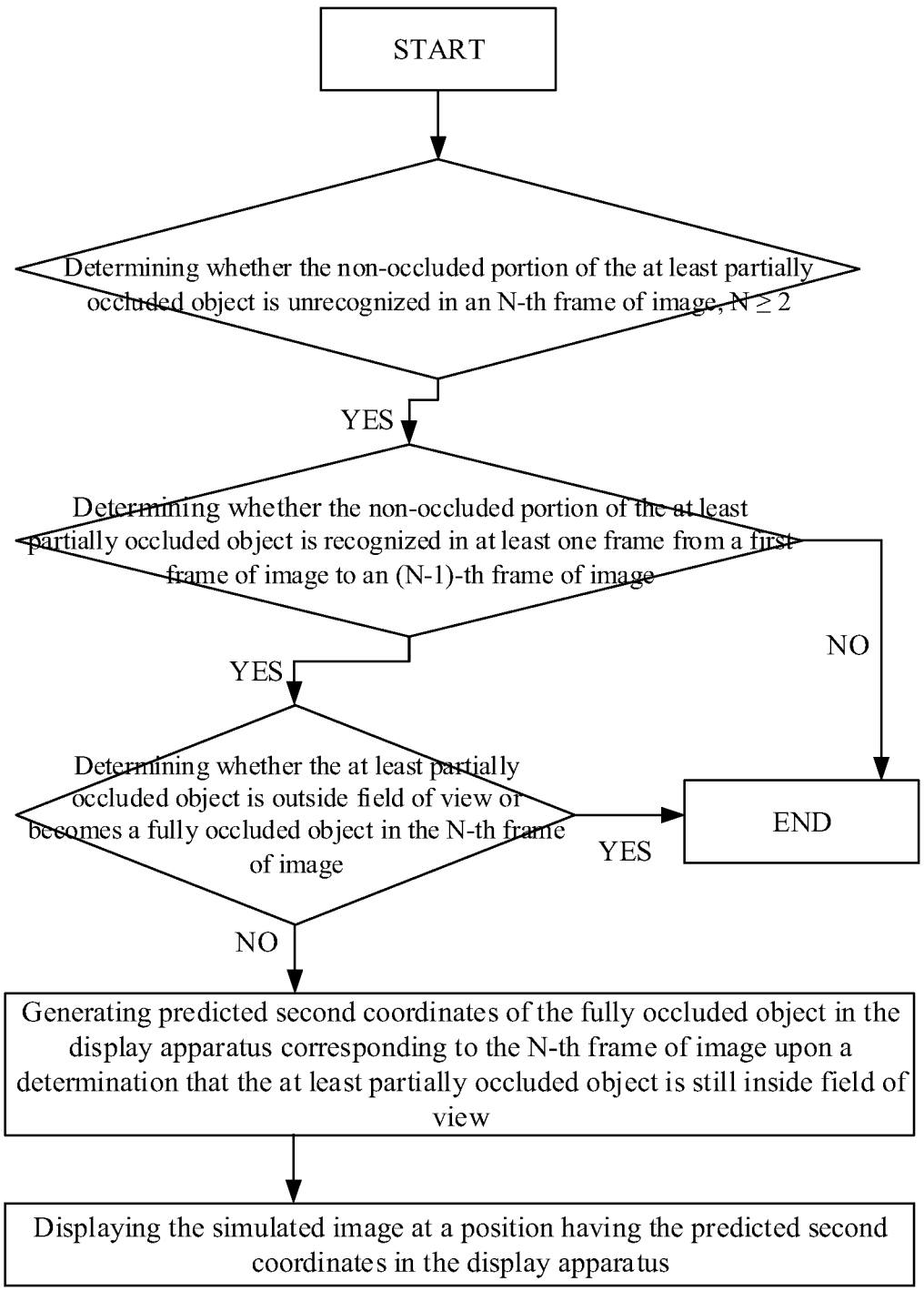
FIG. 8 is a flow chart illustrating a method for tracking an at least partially occluded object in some embodiments according to the present disclosure.

FIG. 8 is a flow chart illustrating a method for tracking an at least partially occluded object in some embodiments according to the present disclosure. Referring to FIG. 8, the method in some embodiments includes determining whether the non-occluded portion of the at least partially occluded object is unrecognized in an N-th frame of image, N≥2. Upon a determination that the non-occluded portion of the at least partially occluded object is unrecognized in the N-th frame of image, the method then determines whether the non-occluded portion of the at least partially occluded object is recognized in at least one frame from a first frame of image to an (N–1)-th frame of image. Upon a determination that the non-occluded portion of the at least partially occluded object is recognized in at least one frame from a first frame of image to an (N–1)-th frame of image, the method further includes determining whether the at least partially occluded object is outside field of view or becomes a fully occluded object in the N-th frame of image. Upon a determination that the at least partially occluded object is still inside field of view, the method then includes generating predicted second coordinates of the fully occluded object in the display apparatus corresponding to the N-th frame of image upon a determination that the at least partially occluded object is still inside field of view; and displaying the simulated image at a position having the predicted second coordinates in the display apparatus.

Optionally, whether the at least partially occluded object is outside field of view can be determined based on a determination of whether second coordinates of the at least partially occluded object corresponding to the (N–1)-th frame of image is still within the display range of the display apparatus. Optionally, based on a determination that the second coordinates of the at least partially occluded object corresponding to the (N–1)-th frame of image is still within the display range of the display apparatus, it is determined that the at least partially occluded object is inside field of view. Optionally, based on a determination that the second coordinates of the at least partially occluded object corresponding to the (N–1)-th frame of image is not within the display range of the display apparatus, it is determined that the at least partially occluded object is outside field of view.

Figure 9:
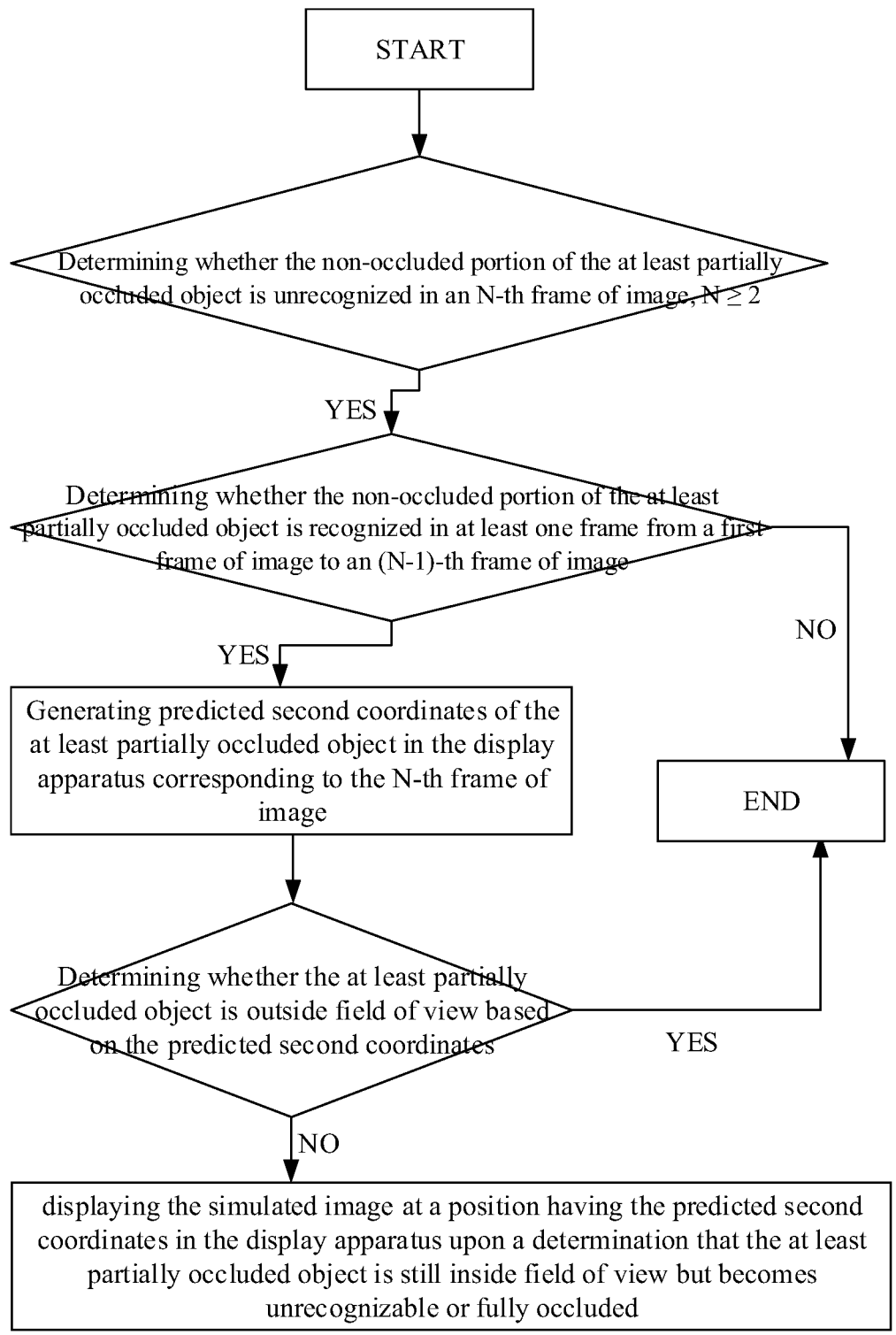
FIG. 9 is a flow chart illustrating a method for tracking an at least partially occluded object in some embodiments according to the present disclosure.

FIG. 9 is a flow chart illustrating a method for tracking an at least partially occluded object in some embodiments according to the present disclosure. Referring to FIG. 8, the method in some embodiments includes determining whether the non-occluded portion of the at least partially occluded object is unrecognized in an N-th frame of image, N≥2. Upon a determination that the non-occluded portion of the at least partially occluded object is unrecognized in the N-th frame of image, the method then determines whether the non-occluded portion of the at least partially occluded object is recognized in at least one frame from a first frame of image to an (N–1)-th frame of image. Upon a determination that the non-occluded portion of the at least partially occluded object is recognized in at least one frame from a first frame of image to an (N–1)-th frame of image, the method further includes generating predicted second coordinates of the at least partially occluded object in the display apparatus corresponding to the N-th frame of image; and determining whether the at least partially occluded object is outside field of view based on the predicted second coordinates. Upon a determination that the at least partially occluded object is inside field of view based on the predicted second coordinates, the method then further includes displaying the simulated image at a position having the predicted second coordinates in the display apparatus upon a determination that the at least partially occluded object is still inside field of view but becomes unrecognizable or fully occluded.

Optionally, whether the at least partially occluded object is outside field of view can be determined based on a determination of whether second coordinates of the at least partially occluded object corresponding to the N-th frame of image is still within the display range of the display apparatus. Optionally, based on a determination that the second coordinates of the at least partially occluded object corresponding to the N-th frame of image is still within the display range of the display apparatus, it is determined that the at least partially occluded object is inside field of view. Optionally, based on a determination that the second coordinates of the at least partially occluded object corresponding to the N-th frame of image is not within the display range of the display apparatus, it is determined that the at least partially occluded object is outside field of view.

In some embodiments, the non-occluded portion of the at least partially occluded object is recognized from an i-th frame of image to a j-th frame of image, i<j<N; and the non-occluded portion of the at least partially occluded object is unrecognized from a (j+1)-th frame of image to an N-th frame of image. Optionally, N≥4. Optionally, the method further includes generating predicted second coordinates of the at least partially occluded object in the display apparatus corresponding to the N-th frame of image according to Equation (5) and Equation (6):

$$u_n = (u_j - u_i)\frac{m_2}{m_1} + u_i; \quad (5)$$

-continued $$v_n = (v_j - v_i)\frac{m_2}{m_1} + v_i; \qquad (6)$$

wherein $(u_n, v_n)$ is the second coordinates of the at least partially occluded object in the display apparatus corresponding to the N-th frame of image; $(u_i, v_i)$ is the second coordinates of the at least partially occluded object in the display apparatus corresponding to the j-th frame of image; $m_1=j-i+1$; and $m_2=n-j$.

In another aspect, the present disclosure further provides a vehicle having an apparatus for tracking an at least partially occluded object described herein or a vehicular anti-collision apparatus described herein. Optionally, a distance between the camera and ground is equal to or less than a threshold distance. Optionally, the apparatus for tracking an at least partially occluded object is configured to generate an alarm signal based on a critical condition being met, for example, the memory further stores computer-executable instructions for controlling the one or more processors to generate an alarm signal based on a critical condition being met. Optionally, the apparatus for tracking an at least partially occluded object is configured to determine whether the critical condition is met based on information including a driving direction and a distance between the camera and the at least partially occluded object, e.g., the memory further stores computer-executable instructions for controlling the one or more processors to determine whether the critical condition is met based on information including a driving direction and a distance between the camera and the at least partially occluded object.

Optionally, when the at least partially occluded object is in a path of the vehicle along the driving direction, and the distance between the camera and the at least partially occluded object is less than a threshold distance, the apparatus for tracking an at least partially occluded object is configured to generate the alarm signal. Optionally, when the at least partially occluded object is outside the path of the vehicle along the driving direction, the alarm signal is not generated. Optionally, the threshold distance is greater than a product of the driving speed and a reaction time of the driver.

Optionally, the vehicle further includes an alarm device, and upon receiving the alarm signal, the alarm device generates an alarm to a driver. Optionally, the alarm includes one or a combination of a textual alarm, a visual alarm, and an audio alarm.

By generating the alarm signal, the driver becomes aware of the presence of the at least partially occluded object, and the movement of the at least partially occluded object can be tracked, potential accidents such as a collision with the pedestrian can be avoided when the pedestrian is moving toward the vehicle. Driving safety can be greatly enhanced in the present vehicle.

In another aspect, the present disclosure provides a computer-program product comprising a non-transitory tangible computer-readable medium having computer-readable instructions thereon. In some embodiments, the computer-readable instructions being executable by a processor to cause the processor to perform recognizing a non-occluded portion of an at least partially occluded object in an input image; generating a simulated image of the at least partially occluded object based on features of the non-occluded portion extracted from the input image; determining first coordinates of the at least partially occluded object in a first coordinate system; and converting the first coordinates of the at least partially occluded object in the first coordinate system into second coordinates in a second coordinate system defined in a display apparatus. Optionally, the first coordinate system is a coordinate system defined in a three-dimensional space. Optionally, the first coordinate system is a three-dimensional coordinate system. Optionally, the second coordinate system defined in the display apparatus is a two-dimensional coordinate system. Optionally, the second coordinate system defined in the display apparatus is a three-dimensional coordinate system.

In some embodiments, the computer-readable instructions being executable by a processor to cause the processor to further perform generating the simulated image of the at least partially occluded object comprises classifying the non-occluded portion using classifiers trained using extracted features of portions of a plurality of training objects. Optionally, the simulated image is an image of one of the plurality of training objects, a portion of which comprising extracted features closest matching the features of the non-occluded portion extracted from the input image.

In some embodiments, the computer-readable instructions being executable by a processor to cause the processor to further perform converting the first coordinates of the at least partially occluded object in the first coordinate system into third coordinates in a third coordinate system; and converting the third coordinates in the third coordinate system into the second coordinates in the second coordinate system defined in the display apparatus. Optionally, the first coordinate system is a three-dimensional coordinate system. Optionally, the third coordinate system is a two-dimensional coordinate system on a plane substantially parallel to an imaging plane of the display apparatus. Optionally, the imaging plane is an imaging plane of a virtual image, thus the imaging plane is a virtual imaging plane. Optionally, the imaging plane is an imaging plane of a real image.

In some embodiments, the computer-readable instructions being executable by a processor to cause the processor to perform converting the first coordinates of the at least partially occluded object in the first coordinate system into the third coordinates in the third coordinate system is performed according to Equation (1) and Equation (2) when the imaging plane of the display apparatus is substantially parallel to a coordinate plane of the first coordinate system:

$$x_2 = x_1 \frac{f}{l}; \qquad (1)$$

$$y_2 = y_1 \frac{f}{l}; \qquad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane. Optionally, the reference point is a position of a view zone (e.g., human eyes) of a viewer (e.g., the driver) in a vehicle. Optionally, f can be expressed as a distance between an orthographic projection of the imaging surface on a coordinate axis in the first coordinate system perpendicular to the imaging surface and an orthographic projection of the reference point on the coordinate axis in the first coordinate system perpendicular to the imaging surface; and l can be expressed as a distance between an orthographic projection of the at least partially occluded object on the coordinate axis in the first coordinate system perpendicular to the imaging surface and the orthographic projection of the reference point on the coordinate axis in the first coordinate system perpendicular to the imaging surface.

In some embodiments, the computer-readable instructions being executable by a processor to cause the processor to perform converting the third coordinates in the third coordinate system into the second coordinates in the second coordinate system defined in the display apparatus is performed according to Equation (3) and Equation (4):

$$u = \frac{x_2}{dx} + u_0; \qquad (3)$$

$$v = \frac{y_2}{dy} + v_0; \qquad (4)$$

wherein (x2, y2) stands for the third coordinates; (u, v) stands for the second coordinates; ($u_0$, $v_0$) stands for a reference coordinate of a reference point in the third coordinate system; dx stands for a real distance representing a first pixel pitch along a first direction (e.g., a row direction) of the display apparatus; dy stands for a real distance representing a second pixel pitch along a second direction (e.g., a column direction) of the display apparatus. Optionally, the reference point is a position of an orthographic projection of a view zone of a viewer in a vehicle on the imaging plane. Optionally, dx can be expressed as a real distance representing a size of a pixel along the first direction (e.g., the row direction) of the display apparatus; and dy stands for a real distance representing a size of a pixel along the second direction (e.g., the column direction) of the display apparatus.

In some embodiments, the non-occluded portion of the at least partially occluded object is recognized in at least one frame from a first frame of image to an (N−1)-th frame of image; and the non-occluded portion of the at least partially occluded object is unrecognized in an N-th frame of image, N≥2. Optionally, the computer-readable instructions being executable by a processor to cause the processor to perform determining whether the at least partially occluded object is outside field of view or becomes a fully occluded object in the N-th frame of image; and generating predicted second coordinates of the fully occluded object in the display apparatus corresponding to the N-th frame of image upon a determination that the at least partially occluded object is still inside field of view.

In some embodiments, the non-occluded portion of the at least partially occluded object is recognized in at least one frame from a first frame of image to an (N−1)-th frame of image; and the non-occluded portion of the at least partially occluded object is unrecognized in an N-th frame of image, N≥2. Optionally, the computer-readable instructions being executable by a processor to cause the processor to perform generating predicted second coordinates of the at least partially occluded object in the display apparatus corresponding to the N-th frame of image; and determining whether the at least partially occluded object is outside field of view based on the predicted second coordinates.

In some embodiments, the non-occluded portion of the at least partially occluded object is recognized from an i-th frame of image to a j-th frame of image, i<j<N; and the non-occluded portion of the at least partially occluded object is unrecognized from a (j+1)-th frame of image to an N-th frame of image. Optionally, the computer-readable instructions being executable by a processor to cause the processor to perform generating predicted second coordinates of the at least partially occluded object in the display apparatus corresponding to the N-th frame of image according to Equation (5) and Equation (6):

$$u_n = (u_j - u_i)\frac{m_2}{m_1} + u_i; \qquad (5)$$

$$v_n = (v_j - v_i)\frac{m_2}{m_1} + v_i; \qquad (6)$$

wherein ($u_n$, $v_n$) is the second coordinates of the at least partially occluded object in the display apparatus corresponding to the N-th frame of image; ($u_i$, $v_i$) is the second coordinates of the at least partially occluded object in the display apparatus corresponding to the j-th frame of image; $m_1$=j−i+1; and $m_2$=n−j.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for tracking an at least partially occluded object, comprising:
recognizing a non-occluded portion of the at least partially occluded object in an input image;
generating a simulated image of the at least partially occluded object based on features of the non-occluded portion extracted from the input image;

determining first coordinates of the at least partially occluded object in a first coordinate system; and converting the first coordinates of the at least partially occluded object in the first coordinate system into second coordinates in a second coordinate system defined in a display apparatus;

wherein converting the first coordinates of the at least partially occluded object in the first coordinate system into the second coordinates in the second coordinate system defined in the display apparatus comprises:

converting the first coordinates of the at least partially occluded object in the first coordinate system into third coordinates in a third coordinate system; and converting the third coordinates in the third coordinate system into the second coordinates in the second coordinate system defined in the display apparatus;

wherein the first coordinate system is a three-dimensional coordinate system, and the third coordinate system is a two-dimensional coordinate system on a plane parallel to an imaging plane of the display apparatus;

wherein converting the first coordinates of the at least partially occluded object in the first coordinate system into the third coordinates in the third coordinate system is performed according to Equation (1) and Equation (2) where the imaging plane of the display apparatus is parallel to a coordinate plane of the first coordinate system:

$$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane.

2. The method of claim 1, wherein generating the simulated image of the at least partially occluded object comprises classifying the non-occluded portion using classifiers trained using extracted features of portions of a plurality of training objects;

wherein the simulated image is an image of one of the plurality of training objects, a portion of which comprising extracted features closest matching the features of the non-occluded portion extracted from the input image.

3. The method of claim 1, wherein converting the third coordinates in the third coordinate system into the second coordinates in the second coordinate system defined in the display apparatus is performed according to Equation (3) and Equation (4):

$$u = \frac{x_2}{dx} + u_0; \quad (3)$$

$$v = \frac{y_2}{dy} + v_0; \quad (4)$$

wherein (x2, y2) stands for the third coordinates; (u, v) stands for the second coordinates; ($u_0$, $v_0$) stands for a reference coordinate of a reference point in the third coordinate system; dx stands for a real distance representing a first pixel pitch along a first direction of the display apparatus; dy stands for a real distance representing a second pixel pitch along a second direction of the display apparatus.

4. The method of claim 1, wherein the non-occluded portion of the at least partially occluded object is recognized in at least one frame from a first frame of image to an (N−1)-th frame of image; and the non-occluded portion of the at least partially occluded object is unrecognized in an N-th frame of image, N≥2;

the method further comprises:

determining whether the at least partially occluded object is outside field of view or becomes a fully occluded object in the N-th frame of image;

generating predicted second coordinates of the fully occluded object in the display apparatus corresponding to the N-th frame of image upon a determination that the at least partially occluded object is still inside field of view; and displaying the simulated image at a position having the predicted second coordinates in the display apparatus.

5. The method of claim 1, wherein the non-occluded portion of the at least partially occluded object is recognized in at least one frame of image from a first frame of image to an (N−1)-th frame of image; and the non-occluded portion of the at least partially occluded object is unrecognized in an N-th frame of image, N≥2;

the method further comprises:

generating predicted second coordinates of the at least partially occluded object in the display apparatus corresponding to the N-th frame of image;

determining whether the at least partially occluded object is outside field of view based on the predicted second coordinates;

displaying the simulated image at a position having the predicted second coordinates in the display apparatus upon a determination that the at least partially occluded object is still inside field of view but becomes unrecognizable or fully occluded.

6. The method of claim 1, wherein the non-occluded portion of the at least partially occluded object is recognized from an i-th frame of image to a j-th frame of image, i<j<N; and the non-occluded portion of the at least partially occluded object is unrecognized from a (j+1)-th frame of image to an N-th frame of image, N≥4;

the method further comprises:

generating predicted second coordinates of the at least partially occluded object in the display apparatus corresponding to the N-th frame of image according to Equation (5) and Equation (6):

$$u_n = (u_j - u_i)\frac{m_2}{m_1} + u_i; \quad (5)$$

-continued $$v_n = (v_j - v_i)\frac{m_2}{m_1} + v_i; \quad (6)$$

wherein $(u_n, v_n)$ is the second coordinates of the at least partially occluded object in the display apparatus corresponding to the N-th frame of image; $(u_i, v_i)$ is the second coordinates of the at least partially occluded object in the display apparatus corresponding to the j-th frame of image; $m_1 = j-i+1$; and $m_2 = n-j$.

7. The method of claim 1, further comprising displaying the simulated image at a position having the second coordinates in the display apparatus.

8. An apparatus for tracking an at least partially occluded object, comprising:
a memory; and
one or more processors;
wherein the memory and the one or more processors are connected with each other; and
the memory stores computer-executable instructions for controlling the one or more processors to:
recognize a non-occluded portion of the at least partially occluded object in an input image;
generate a simulated image of the at least partially occluded object based on features of the non-occluded portion extracted from the input image;
determine first coordinates of the at least partially occluded object in a first coordinate system; and
convert the first coordinates of the at least partially occluded object in the first coordinate system into second coordinates in a second coordinate system defined in a display apparatus;
wherein the memory further stores computer-executable instructions for controlling the one or more processors to:
convert the first coordinates of the at least partially occluded object in the first coordinate system into third coordinates in a third coordinate system; and
convert the third coordinates in the third coordinate system into the second coordinates in the second coordinate system defined in the display apparatus;
wherein the first coordinate system is a three-dimensional coordinate system; and
the third coordinate system is a two-dimensional coordinate system on a plane parallel to an imaging plane of the display apparatus; and
wherein the memory further stores computer-executable instructions for controlling the one or more processors to convert the first coordinates of the at least partially occluded object in the first coordinate system into the third coordinates in the third coordinate system according to Equation (1) and Equation (2) when the imaging plane of the display apparatus is parallel to a coordinate plane of the first coordinate system:

$$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane.

9. The apparatus of claim 8, wherein the memory further stores computer-executable instructions for controlling the one or more processors to classify the non-occluded portion using classifiers trained using extracted features of portions of a plurality of training objects;
wherein the simulated image is an image of one of the plurality of training objects, a portion of which comprising extracted features closest matching the features of the non-occluded portion extracted from the input image.

10. The apparatus of claim 8, wherein the memory further stores computer-executable instructions for controlling the one or more processors to convert the third coordinates in the third coordinate system into the second coordinates in the second coordinate system defined in the display apparatus according to Equation (3) and Equation (4):

$$u = \frac{x_2}{dx} + u_0; \quad (3)$$

$$v = \frac{y_2}{dy} + v_0; \quad (4)$$

wherein (x2, y2) stands for the third coordinates; (u, v) stands for the second coordinates; $(u_0, v_0)$ stands for a reference coordinate of a reference point in the third coordinate system; dx stands for a real distance representing a first pixel pitch along a first direction of the display apparatus; dy stands for a real distance representing a second pixel pitch along a second direction of the display apparatus.

11. The apparatus of claim 8, wherein the non-occluded portion of the at least partially occluded object is recognized in at least one frame from a first frame of image to an (N−1)-th frame of image; and
the non-occluded portion of the at least partially occluded object is unrecognized in an N-th frame of image, N≥2;
wherein the memory further stores computer-executable instructions for controlling the one or more processors to:
determine whether the at least partially occluded object is outside field of view or becomes a fully occluded object in the N-th frame of image; and
generate predicted second coordinates of the fully occluded object in the display apparatus corresponding to the N-th frame of image upon a determination that the at least partially occluded object is still inside field of view;
wherein the apparatus further comprises a display apparatus configured to display the simulated image at a position having the predicted second coordinates in the display apparatus.

12. The apparatus of claim 8, wherein the non-occluded portion of the at least partially occluded object is recognized in at least one frame from a first frame of image to an (N−1)-th frame of image; and
the non-occluded portion of the at least partially occluded object is unrecognized in an N-th frame of image, N≥2;

wherein the memory further stores computer-executable instructions for controlling the one or more processors to:
generate predicted second coordinates of the at least partially occluded object in the display apparatus corresponding to the N-th frame of image; and
determine whether the at least partially occluded object is outside field of view based on the predicted second coordinates;
wherein the apparatus further comprises a display apparatus configured to display the simulated image at a position having the predicted second coordinates in the display apparatus upon a determination that the at least partially occluded object is still inside field of view but becomes unrecognizable or fully occluded.

13. The apparatus of claim 8, wherein the non-occluded portion of the at least partially occluded object is recognized from an i-th frame of image to a j-th frame of image, i<j<N; and
the non-occluded portion of the at least partially occluded object is unrecognized from a (j+1)-th frame of image to an N-th frame of image, N≥4;
wherein the memory further stores computer-executable instructions for controlling the one or more processors to:
generate predicted second coordinates of the at least partially occluded object in the display apparatus corresponding to the N-th frame of image according to Equation (5) and Equation (6):

$$u_n = (u_j - u_i)\frac{m_2}{m_1} + u_i; \quad (5)$$

$$v_n = (v_j - v_i)\frac{m_2}{m_1} + v_i; \quad (6)$$

wherein $(u_n, v_n)$ is the second coordinates of the at least partially occluded object in the display apparatus corresponding to the N-th frame of image; $(u_i, v_i)$ is the second coordinates of the at least partially occluded object in the display apparatus corresponding to the j-th frame of image; $m_1=j-i+1$; and $m_2=n-j$.

14. The apparatus of claim 8, wherein the apparatus further comprises a display apparatus configured to display the simulated image at a position having the second coordinates in the display apparatus.

15. A vehicle, comprising the apparatus of claim 8.

16. A computer-program product comprising a non-transitory tangible computer-readable medium having computer-readable instructions thereon, the computer-readable instructions being executable by a processor to cause the processor to perform:
recognizing a non-occluded portion of an at least partially occluded object in an input image;
generating a simulated image of the at least partially occluded object based on features of the non-occluded portion extracted from the input image;
determining first coordinates of the at least partially occluded object in a first coordinate system; and
converting the first coordinates of the at least partially occluded object in the first coordinate system into second coordinates in a second coordinate system defined in a display apparatus;
wherein converting the first coordinates of the at least partially occluded object in the first coordinate system into the second coordinates in the second coordinate system defined in the display apparatus comprises:
converting the first coordinates of the at least partially occluded object in the first coordinate system into third coordinates in a third coordinate system; and
converting the third coordinates in the third coordinate system into the second coordinates in the second coordinate system defined in the display apparatus;
wherein the first coordinate system is a three-dimensional coordinate system, and the third coordinate system is a two-dimensional coordinate system on a plane parallel to an imaging plane of the display apparatus;
wherein converting the first coordinates of the at least partially occluded object in the first coordinate system into the third coordinates in the third coordinate system is performed according to Equation (1) and Equation (2) where the imaging plane of the display apparatus is parallel to a coordinate plane of the first coordinate system:

$$x_2 = x_1 \frac{f}{l}; \quad (1)$$

$$y_2 = y_1 \frac{f}{l}; \quad (2)$$

wherein (x2, y2) stands for the third coordinates; (x1, y1) stands for coordinate differences between the first coordinates and a reference coordinate of a reference point in the first coordinate system; f stands for a length of an orthographic projection of a distance between the imaging plane and the reference point on a coordinate axis in the first coordinate system perpendicular to the imaging plane; and l stands for a length of an orthographic projection of a distance between the at least partially occluded object and the reference point on the coordinate axis in the first coordinate system perpendicular to the imaging plane.

* * * * *